April 13, 1948.  C. E. HATHORN  2,439,569
UNIVERSAL JOINT
Filed Sept. 9, 1944

INVENTOR.
CHARLES E. HATHORN
BY George F. Goodyear
ATTORNEY

Patented Apr. 13, 1948

2,439,569

UNITED STATES PATENT OFFICE 2,439,569

UNIVERSAL JOINT

Charles E. Hathorn, Kenmore, N. Y., assignor to Curtiss-Wright Corporation, a corporation of Delaware Application September 9, 1944, Serial No. 553,388

7 Claims. (Cl. 64—17)

1

This invention relates to universal joints such as are used in the driving shafts for operating machinery or in remote control mechanisms and more particularly to the yoke and trunnion type.

A desirable feature in a universal joint is simplicity. In some joints the trunnions usually consist of a solid cross, or an intermediate block with at least two pins. In the latter, one pin is necessarily smaller than the other in order to pass through a hole at 90° in the longitudinal center of the larger pin. Moreover, the two pin type requires different size bores in the yokes, one yoke having bores for the large pin and the other having smaller bores for the small pin. The solid cross type requires separate bearing caps in order that the joint may be assembled. In either type the machining operations during manufacture are excessive or are not standardized thereby making the manufacture costly.

It is an object of this invention, therefore, to provide a universal joint in which the yokes are identical and the trunnion pins all the same size and shape, the whole being easily assembled.

A still further and important feature and object is to provide yokes and pins which are interchangeable, thereby reducing the various machine operations to a minimum and hence materially reducing the cost of the article.

Another object is to provide a universal joint that can be assembled from so-called "standard parts" such as tubing, yoked rod ends, clevis pins and cotters.

Still another object is to provide a universal joint which may be adapted to the use of plain or frictionless bearings and one easily provided with means for bearing lubrication.

Another object is to provide a universal joint in which the principle involved may be adopted for drive shafts of machinery, or one that may be readily and cheaply assembled for remote control rods for actuating valves or other equipment wherein a universal joint might be advantageous.

Further objects of the invention and novel features of the construction will be apparent from the following specification when considered together with the accompanying drawing, in which.

2

Figure 4:
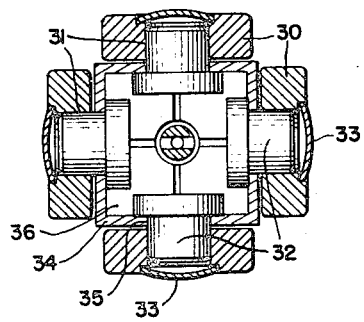
Figure 4 is a sectional view of a modification taken on line 2—2 of Figure 1.
Figure 5:
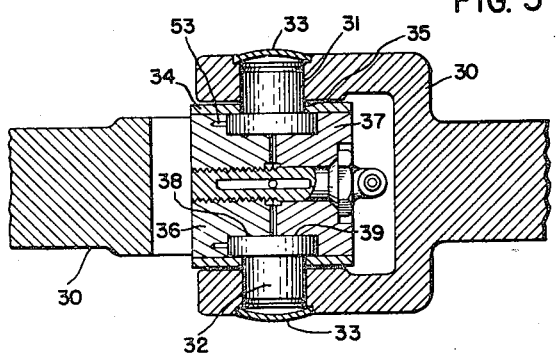
Figures 6, 7:
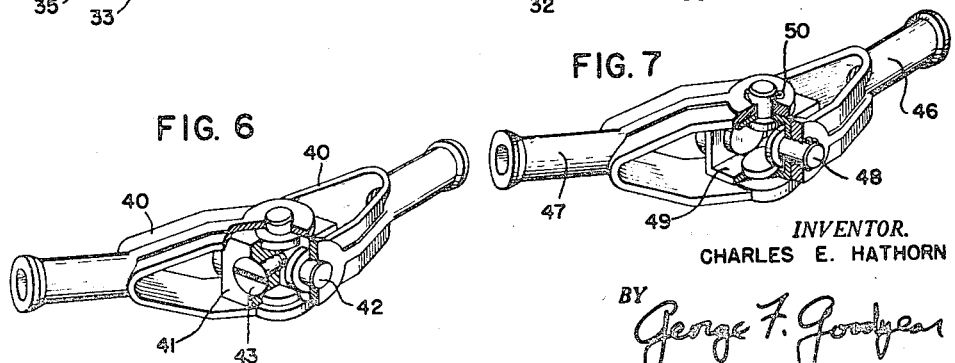

Figure 5 is a longitudinal sectional view of the modification shown in Figure 4, Figure 6 is a perspective view partly in section of a further modification, Figure 7 is a perspective view partly in section of a still further modification.

Figure 1:
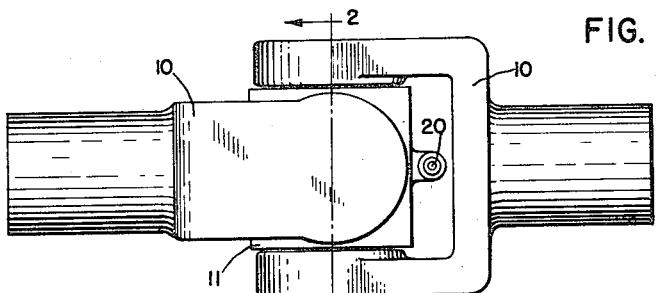
Figure 1 is an assembly view of a universal joint embodying my invention.
Figure 2:
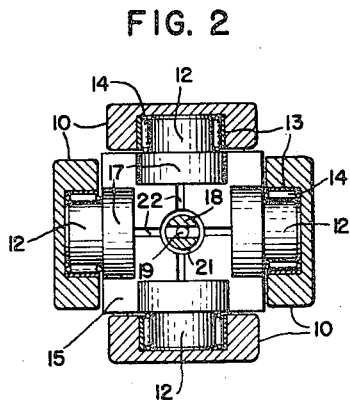
Figure 2 is a sectional view taken on the line 2—2 of Figure 1.
Figure 3:
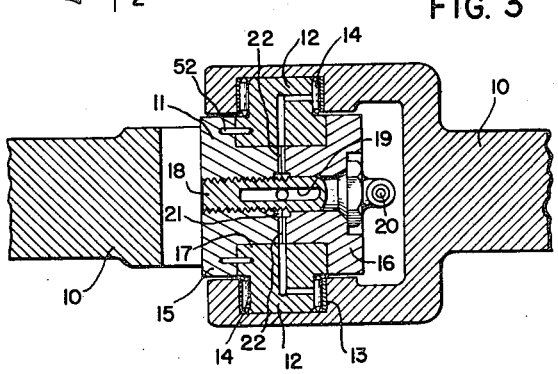
Figure 3 is a longitudinal sectional view through the universal joint assembly shown in Figure 1.

Referring now to the drawings for an understanding of this invention there is shown in Figures 1 through 3 a particularly desirable type of universal joint in which identical yoke members 10 are operatively connected through the interposition of a block 11 and suitable trunnion elements 12. In the construction of this universal joint each of the yoke members 10 is provided with a pair of inwardly opening recesses 13 for the reception of trunnion elements 12, the latter being journalled therein upon needle bearings 14. Each of the trunnion elements or members 12 is in turn secured in proper position by means of the block member 11 which in this case is comprised of two substantially identical parts 15 and 16. Each of the block parts has formed therein a series of semi-circular recesses so that upon assembly in the manner shown in Figure 3 the enlarged base portion 17 of each of the trunnion elements 12 may be received in the cooperatively registering recesses and thereby be suitably clamped or held therein upon securement of the block parts in assembly as by a threaded element shown at 18.

While it is not necessary in all cases to provide an internal lubricating system such a system may be conveniently incorporated in the manner now to be described in connection with Figure 3. In this view the block securing member 18 is provided with an internal bore or lubricant passage 19 which is supplied with lubricant through a delivery port 20 in the manner of the well known Zerk fitting. Lubricant supplied to the longitudinal bore 19 of member 18 is delivered to a central annular chamber 21 through suitable ports or apertures and is conducted by laterally extending channels 22 formed in each of the block parts 15 and 16 to and through suitable passages provided in each of the trunnion elements. In this manner lubricant introduced at port 20 will be supplied directly to the needle bearing elements 14.

An alternate arrangement for a universal joint is shown in detail in Figures 4 and 5 in which the cooperating and identical yoke members 30 are each provided with aligned bores 31 for the reception and journalling therein of trunnion elements 32, these trunnion elements being identical each with the other and hence arrangement of the trunnion elements 12 heretofore described in connection with the universal joint illustrated in Figure 1. However, in the present modified construction each of the trunnion elements 32 is mounted directly in the yoke bores 31 without benefit of frictionless bearings. The outer open ends of each of the bores 31 is adapted to be closed as by means of a Welch plug 33 or other suitable means.

In this arrangement the block member of the universal joint is comprised first of a section of square tubing or what may be termed as a rectilinear shell member 34 which is open at opposite ends thereof and is further provided with suitable bores 35 in its side walls, each of which is in registry with a bore 31 formed in the yoke members. Accordingly the trunnion elements 32 are adapted to be mounted first in the shell member 34 and are directed outwardly for final engagement with the yokes. The trunnion elements are in turn secured and clamped in position and are further prevented from inward displacement by means of a pair of identical block elements 36 and 37 positioned internally in the shell 34 and arranged in abutment as clearly indicated in Figure 5. Here again each of the block members 36 and 37 is provided with suitable semi-circular recesses or notches 38 and 39 respectively, the recesses registering to form a recess for the reception and clamping of a trunnion element.

Lubrication of this universal joint is carried out in a similar manner to that described in connection with the structural arrangement of Figure 3 and therefore it is believed that no detailed description is necessary.

A further modification of a universal joint is illustrated in Figure 6 in which the yoke members 40 are adapted to be swivelly connected by means of a split block 41 and identical trunnion elements 42. The features of construction of this modification are somewhat similar to those described in connection with Figure 3. However, the block member 41 which is also of a split type is adapted to be secured in position and thus clamp the trunnion elements as by means of a threaded element or counter-sunk screw shown at 43.

A still further modification and important arrangement of universal joint construction is illustrated in Figure 7. This construction is perhaps the simplest and most advantageous since it requires the fewest number of parts, the yokes and trunnions are identical and interchangeable and all parts can be made from standard stock materials. For example, the identical yoke members 46 and 47 are adapted to be swivelly united by means of identical and interchangeable trunnion elements 48 which in turn are initially positioned in a shell type block 49. Each of the trunnion elements 48 is inserted from within the block element through suitable bores formed therein and is adapted to project through a registering bore in the yoke members and to be secured against inward displacement or dislodgement by means of a cotter or other locking device 50. It will be observed that in this construction the shell member 49 is similar to the shell member 34 of the construction described in connection with Figure 5. However, in this case no internal solid member or block is required and hence a light weight and easily assembled universal joint results.

Returning briefly to Figure 3 it will be noted that the trunnion elements 12 are each adapted to be secured against rotation by means of a dowel pin 52 which is inserted in a dowel bore in trunnion head 17. Block part 15 is also provided with a dowel receiving bore which receives the dowel pin and hence locks the trunnion in position. It is thought necessary to employ these dowel pins in order to obviate manufacturing difficulties in forming a substantially fluid tight lubricating passage 22 between the block 15 and 16. A single dowel pin for each trunnion will suffice. Similarly the alternate construction shown in Figure 4 will include dowel locking pins 53 which serve to lock the trunnion elements 32 to the block part 36.

Still other modifications may be shown in which the yoke and trunnion members as well as the block parts can be identical and interchangeable parts and in which assembly difficulties and manufacturing costs have been reduced to a minimum. It is the aim herein to cover all such changes and modifications as may come within the scope of the claims hereto appended.

What is claimed is:

1. A universal joint comprising a pair of cooperating yokes, each having a pair of inwardly opening recesses, a different trunnion element journalled in each of the four yoke recesses, and a block member positioned inwardly of the yokes and around the inner ends of the trunnion elements, said block including two parts, each being substantially identical and each having cooperating recesses which when assembled receive and clamp said trunnion elements in position, the block recesses having bottom walls supporting the trunnions against inward displacement.

2. A universal joint including a pair of cooperating yokes each provided with a pair of inwardly opening recesses, a trunnion element journalled in each of said yoke recesses, a split block member providing when in assembly trunnion receiving recesses whereby said trunnion elements may be secured in position and hence secure said yokes in assembly, and means to retain said split block member in assembly, said trunnion elements, block member and block retaining means having formed therein interconnecting passages to receive and conduct lubricant to said trunnion elements journalled in said yokes.

3. A universal joint including a pair of yokes, a pair of trunnion elements journalled in each of said yokes to permit universal swivelling action thereof, means provided with apertures through which the trunnion elements extend, said means being adapted to align said trunnion elements in assembly with said yokes, and means adapted to secure said yokes and trunnion elements in assembly, said last means comprising a split block member having recesses therein to receive and clamp said trunnion elements against rotation, and a threaded member securing said split block in assembly.

4. A universal joint comprising a pair of yoke members, an open ended shell member interposed between said yokes, the side walls of said shell member and said yokes having sets of registering openings formed therein, a trunnion element slidably mounted outwardly through each of said shell openings and journalling in a registering opening in said yokes, each of said trunnion elements having a head engaging the inner wall of the shell to secure the trunnion elements against outward displacement, and means to secure said trunnion elements against inward displacement.

5. A universal joint comprising a pair of yoke members, an open ended shell member interposed between said yokes, the side walls of said shell member and said yokes having sets of registering openings formed therein, a trunnion element slidably mounted outwardly through each of said shell openings and journalling in a registering opening in said yokes, and means to secure said trunnion elements including a pair of block elements slidably inserted through the open ends of said shell and retained therein substantially in abutment.

6. A universal joint comprising a pair of yoke members, a split block interposed between the yoke members, the yoke members each having a pair of recesses formed therein and the interposed split block having formed therein a split recess registering with each of the yoke member recesses, a separate trunnion element positioned in each set of registering recesses, the block recesses having bottom walls supporting the trunnions against inward displacement, and means retaining said split block in assembly comprising a single centrally disposed fastener.

7. A universal joint comprising a pair of yoke members, an open ended shell member interposed between said yokes, the side walls of the shell member and said yokes having sets of registering openings formed therein, a trunnion element slidably mounted outwardly through each of said shell openings and journalled in a registering opening in one of said yokes, each of said trunnion elements having at its inner end an enlarged portion to prevent outward displacement thereof, means securing said trunnion elements against inward displacement comprising a pair of retainer elements inserted through the open ends of the shell, and means comprising a single fastener for securing said retainer elements in clamping engagement with the enlarged portions of said trunnions.

CHARLES E. HATHORN.

REFERENCES CITED

The following references are of record in the file of this patent:

UNITED STATES PATENTS

| Number | Name | Date |
| --- | --- | --- |
| 272,339 | Shuman | Feb. 13, 1883 |
| 719,411 | Bocorselski | Jan. 27, 1903 |
| 1,494,645 | Thiemer | May 20, 1924 |
| 1,695,116 | Lord | Dec. 11, 1928 |
| 1,700,991 | Wintercorn | Feb. 5, 1929 |
| 1,918,613 | Peters | July 18, 1933 |
| 2,170,315 | Wonderly | Aug. 22, 1939 |

FOREIGN PATENTS

| Number | Country | Date |
| --- | --- | --- |
| 6,782 | Great Britain | 1914 |
| 232,759 | Germany | 1911 |